Figure 1:
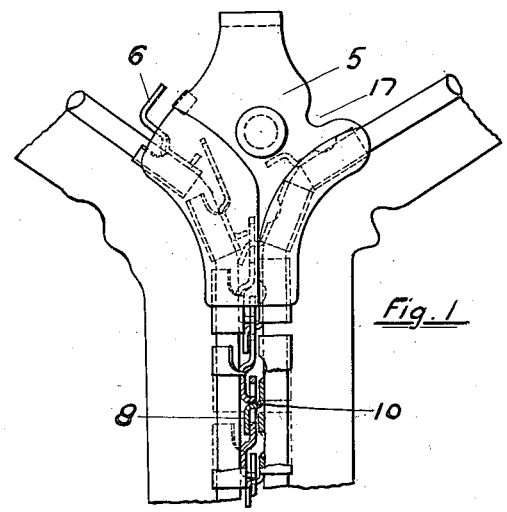

G. SUNDBACK.
SEPARABLE FASTENER.
APPLICATION FILED APR. 2, 1908.

1,060,378.

Patented Apr. 29, 1913.

WITNESSES:
Geo. A. Hoffman
Geo. N. Kerr

INVENTOR
Gideon Sundback,
BY
Edwards, Sager & Wooster,
ATTORNEYS.

UNITED STATES PATENT OFFICE.

GIDEON SUNDBACK, OF HOBOKEN, NEW JERSEY, ASSIGNOR TO AUTOMATIC HOOK AND EYE COMPANY, A CORPORATION OF NEW JERSEY.

SEPARABLE FASTENER.

1,060,378.  Specification of Letters Patent.  Patented Apr. 29, 1913.

Application filed April 2, 1908. Serial No. 424,688.

*To all whom it may concern:*

Be it known that I, GIDEON SUNDBACK, a subject of the King of Sweden, residing at Hoboken, in the county of Hudson and State of New Jersey, have invented certain new and useful Improvements in Separable Fasteners, of which the following is a full, clear, and exact specification.

This invention relates to separable fasteners, and has particular reference to improvements in that type of separable fastener shown in Patent No. 788317, dated April 25, 1905, whereby the fastener is rendered more flexible and the possibility of accidental disengagement of the hook and eye members obviated.

More specifically this invention is concerned with a novel form of eye member over that shown in the patent aforesaid, together with an improved locking means for preventing disengagement of the fastener when the parts have once been coupled. The fastener of the aforesaid patent generally comprises two flexible stringers one of said stringers having its edge provided with a series of hook members and the other stringer having its edge provided with co-operating eye members, together with a sliding cam operating device mounted on both stringers whereby to couple and uncouple them. In this fastener, the hook members comprise channels clamped to the edge of the stringer and having at one end projecting hook members overhanging the adjacent hook member, and these overhanging hook members engage with one end of channel members on the other stringer, respectively opposite the hook members, the members on each stringer being slightly spaced apart to permit of the stringers being flexed. In this construction a comparatively long hook member is required in order to remain in engagement with the eye member when the stringers or chains are bent, and as the angle of bending becomes more acute, the hook tends to become disengaged from the eye at the side, this being by reason of the larger angular movement of the point of the hook relatively to the eye, about the axis of bending, since the eye and the point of the hook tend to move away from each other.

According to this invention, the eye member preferably comprises a channel base for attachment to the stringers and the engaging portion consists of a loop lying in a plane parallel to the stringer, the hook members being disposed on the other chain relatively to these eye members so that the point of the hook will pass through and be engaged under one end of the loop, while the sides of the loop will engage the shank of the hook and prevent its disengagement when the chains are bent. By this construction, sidewise disengagement of the hook and eye is prevented by the sides of the loop engaging the shank of the hook, permitting the point of the hook to swing freely through the necessary arc without affecting the engagement of the sides of the loop and the shank of the hook. In order to attain this result, it is desirable to locate the loop of the eye relatively to the hook in such position that the loop of the eye will include the axis about which the shank of the hook member turns, so that there will be a very slight relative movement of the shank of the hook and the eye.

A further feature of the invention comprises a locking member for preventing disengagement of the hook from the loop by a longitudinal movement, after the hook has passed into the eye.

The invention will be more fully understood in connection with the description of the accompanying drawings, wherein—

Figure 4:
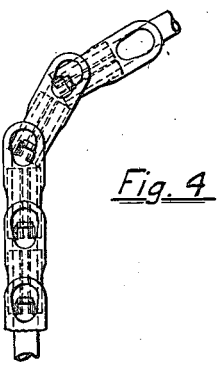
Figure 2:
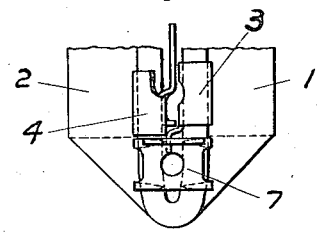
Figure 3:
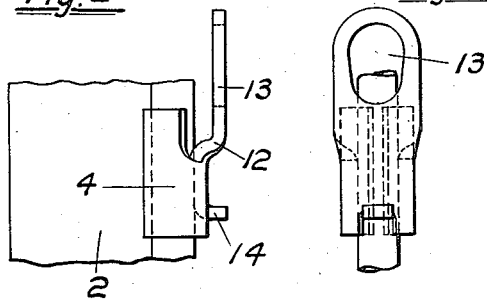
Figure 5:
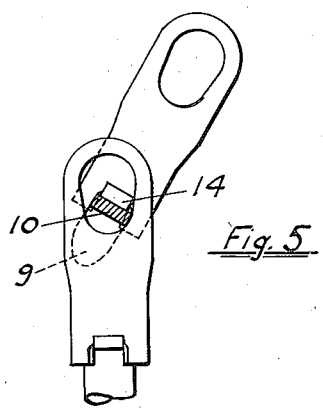

Figure 1 represents a perspective view of a fastener embodying the invention, showing the chains coupled; Fig. 2 is a detail view on an enlarged scale showing a fragment of the chain and an eye member; Fig. 3 is an edge view of the eye member showing the preferred form of loop; Fig. 4 is an edge view showing the position of the parts when the chain is bent; and Fig. 5 is a detail view on an enlarged scale showing the coupling members when bent laterally.

1, 2 represent two flexible chains adapted to be secured to a garment or other device and having interlocking hook members 3 and eye members 4 respectively, a slider 5, a top stop 6, and a bottom stop 7. The structure of chains and the hook members 3 is similar to that described in the patent aforesaid, each chain specifically comprising a continuous tape or stringer having a corded edge on which the links consisting of channel-shaped pieces of metal are clamped by pressure. but it will be understood that this invention is not restricted to a chain of any particular character or material, nor to any particular character of link other than necessary to carry out the invention herein claimed. In practice, the hook links 3 will all be preferably mounted on one chain and the links 4 on the other chain and interlocking edgewise, the eye links being provided with a novel form of locking member to be hereinafter described for preventing disengagement by longitudinal movement. The hook members 3 are provided with engaging projections 8 consisting of a point 9 and a shank 10, which are in general similar to the corresponding hook members shown in said patent, but by reason of the different construction of eye member herein described somewhat shorter than is necessary in the aforesaid construction.

The eye members shown in Figs. 2 and 3 comprise the channel body portion 4, which is clamped to the stringer similarly to the hook members, a shank 12, and a loop 13, the loop 13 being substantially flat and extending in a direction parallel to the edge of the stringer and somewhat separated therefrom by reason of the shank 12. It will be noticed that the loop 13 projects beyond the end of the channel 4 so that it will overhang the adjacent eye member. The opposite end of the channel 4 of the eye member is provided with a stop lug 14, the function of which is to pass through the loop 13 of the next lower eye member, and act as a stop by engaging the shank of the next hook member as shown in Fig. 5, so that this stop lug 14 engages the shank of the hook to prevent movement in one direction and movement of the shank in the other direction is prevented by the loop itself.

The slider 5 is provided with a cam edge 17 on the entering side of the hook carrying chain 1 for automatically turning the hooks into the engaging plane as they enter the slider, and the slider has converging cam channels through which the hook and eye members respectively pass in locking and unlocking. The operation of locking is effected by pulling the slider 5 upwardly on the chains causing the hooks to pass first through the loops 13 and then the opposite locking lug 14 follows as shown in Fig. 1, thus locking the hook. The operation of unlocking is effected by pulling the upper ends of the chains apart, causing the slider to slide down on the chains simultaneously, these operations of locking and unlocking being exactly the same as described in the aforesaid patent.

In the aforesaid Patent No. 788317, it will be observed that when the coupled chains are bent, the points of the hooks tend to disengage themselves from the sides of the eyes, thus necessitating a longer hook in order to prevent such disengagement. The effect of making a longer hook is that disengagement is prevented, but in case of extreme bending, the point of the hook will be bent and in some instances broken off by engagement of the point of the hook with the side of the eye. The distinguishing feature of this invention is that the point of the hook is only used to prevent bodily separation of the stringers while it is perfectly free to swing laterally through as large an arc of bending as is necessary, (see Fig. 5), and disengagement of the eye from the hook by the lateral flexure is prevented by reason of the sides of the loop engaging the shank of the hook. It will also be observed that the respective hook and eye members are somewhat staggered on the chains, this being to cause the axis of bending to pass through the eye, so that the arc of movement of the shank of the hook may be very small relatively to the eye, whereby the point of the hook can swing through a maximum arc without in any way affecting the engagement of the hook and eye, which is not the case in the prior patent referred to.

In practice, it is advantageous to close the end of the loop, as herein shown, since thereby sharp prongs or corners are avoided, which might catch in the fabric. By this invention a much stronger construction is secured and the chains can be bent through a shorter angle without in any way straining the hooks or causing disengagement, it being practically impossible with this construction to disengage the hooks and eyes by laterally bending them, without completely destroying the fastener.

Various modifications and changes in the specific construction herein described may be made without departing from the essential features of the invention which is therefore not to be limited to the exact construction herein described while within the scope of the appended claims.

Having thus described my invention, I declare that what I claim as new and desire to secure by Letters Patent, is,—

1. The combination with a stringer having a hook member secured to its edge, of a second stringer having an eye member secured to its edge, said eye member comprising a loop extending longitudinally of the stringer at a distance therefrom and adapted to receive said hook, and a second member adjacent said eye member having a projection adapted to enter said loop to confine the hook.

2. The combination with a pair of flexible stringers, one carrying loop eye members and the other carrying hook members adapted to enter said loops, of a series of means entering said loops to confine the hooks therein.

3. A fastener comprising a stringer carrying hook members on its edge, a second stringer carrying loop eye members on its edge, through which loops the hooks pass, a locking member also adapted to pass into the eye to confine the hook, and a sliding operating device mounted on both stringers and causing the locking member to pass into the eye after the hook to confine the latter.

In testimony whereof I affix my signature, in presence of two witnesses.

GIDEON SUNDBACK.

Witnesses:
JULIAN S. WOOSTER,
GEO. A. HOFFMAN.